United States Patent [19]

Simmons et al.

[11] Patent Number: 5,676,406
[45] Date of Patent: Oct. 14, 1997

[54] MULTIPLE SYNCHRONIZED THREAD FLUID CONNECTOR

[76] Inventors: John M. Simmons, 605 Slayton; Tom M. Simmons, 504 Slayton, both of Saginaw, Mich. 48603

[21] Appl. No.: 532,220

[22] Filed: Sep. 22, 1995

Related U.S. Application Data

[63] Continuation-in-part of Ser. No. 178,909, Jan. 7, 1994, Pat. No. 5,452,748.

[51] Int. Cl.⁶ .................................................. F16L 35/00
[52] U.S. Cl. ........................ 285/333; 285/390; 285/392; 411/411; 411/424
[58] Field of Search ............................. 138/96 T, 89; 285/392, 357, 333, 390, 393; 403/299, 343, 342, 307, 296; 411/427, 436, 411, 424, 378; 215/329, 356; 220/288

[56] References Cited

U.S. PATENT DOCUMENTS

| | | |
|---|---|---|
| 417,393 | 12/1889 | McAllister . |
| 1,372,876 | 3/1921 | Freund . |
| 1,474,905 | 11/1923 | Keszthelyi . |
| 2,019,402 | 10/1935 | Duffy ............................. 215/43 |
| 2,678,226 | 5/1954 | Wright ............................. 287/60 |
| 2,977,993 | 4/1961 | Scherer ............................. 138/96 |
| 3,120,570 | 2/1964 | Kennedy ............................. 264/45 |
| 3,308,979 | 3/1967 | Hailes ............................. 215/9 |
| 3,470,929 | 10/1969 | Thornton ............................. 150/0.5 |
| 4,342,337 | 8/1982 | Underwood ............................. 138/96 T |
| 4,986,078 | 1/1991 | Laskaris ............................. 62/51.1 |
| 5,045,826 | 9/1991 | Laskaris ............................. 335/301 |

*Primary Examiner*—Terry Lee Melius
*Assistant Examiner*—Heather Shackelford
*Attorney, Agent, or Firm*—Prince, Yeates & Geldzahler

[57] ABSTRACT

A screw-threaded connection incorporates multiple synchronized threads, that is, one connection element has a set of external threads that mates with a corresponding set of internal threads on the mating connection element, in customary fashion. The first connection element additionally includes a second set of internal threads synchronized with the first set such that the leads of both sets of threads are the same. This second set of internal threads mates with a corresponding set of external threads on the mating connection element. Of course, the two sets of threads on the mating connection element are synchronized such that their leads are the same, and, of course, the same as first sets of mating multiple synchronized threads. This multiple synchronized thread connection has application to any fluid connector and particularly to fluid connectors in wide-variant temperature deviation, high-pressure, and/or mechanical vibration environments.

24 Claims, 6 Drawing Sheets

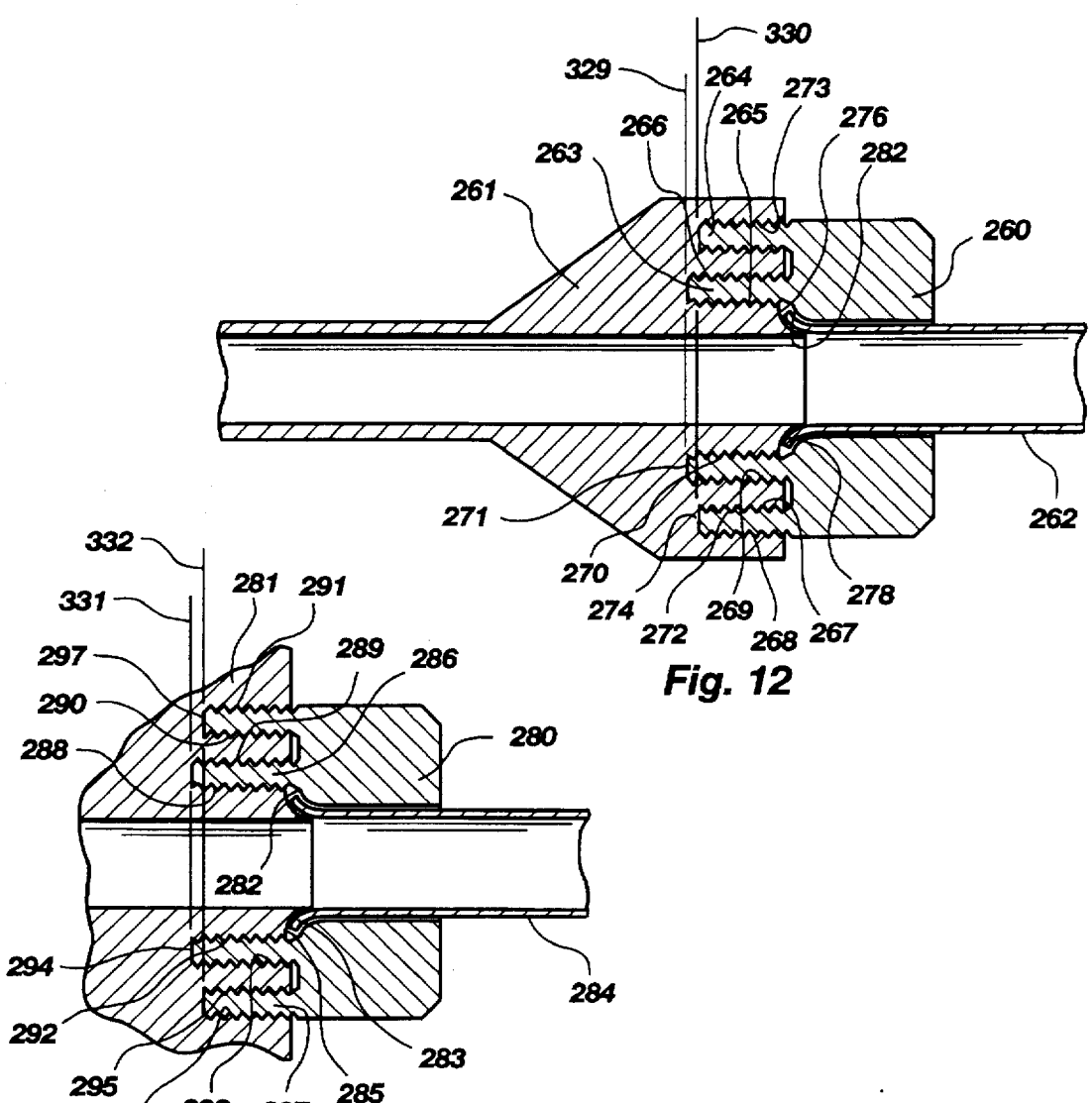
Fig. 12
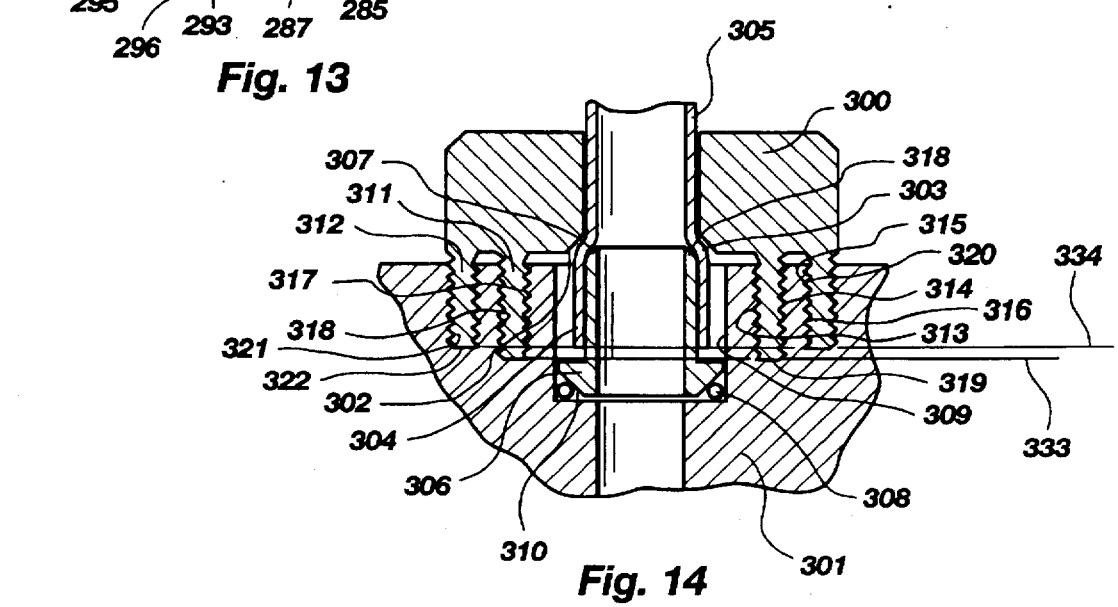
Fig. 13
Fig. 14

MULTIPLE SYNCHRONIZED THREAD FLUID CONNECTOR

CROSS-REFERENCE TO RELATED APPLICATION

This application is a Continuation-In-Part of U.S. application entitled Synchronized Dual Thread Connector, U.S. Ser. No. 08/178,909, filed Jan. 7, 1994, now U.S. Pat. No. 5,452,748, issued Sep. 26, 1995.

BACKGROUND OF THE INVENTION

1. Field of the Invention

The present invention relates to connectors and other threaded mechanisms, and more particularly, relates to threaded fluid connectors that incorporate mating sets of multiple synchronized threads for effecting the union between the threaded connections.

2. Description of the Prior Art

It is well known in the prior art to have a tube, pipe or other cylindrical object that incorporates dual threads. That is, a portion of the external surface of the pipe includes external threads, and a portion of the internal surface of the pipe includes internal threads. Such dual-threaded cylindrical devices are typically utilized wherein a cap or cover screws onto the end of the pipe or tube utilizing the external threads, and the internal threads are utilized for providing a screw-adjustment to an internal mechanism where the tube or pipe is connected. An example is a fluid pressure relief valve, wherein the relief pressure is adjustable by turning a threaded plug or the like within the internally threaded tube, the threaded plug engaging a spring and ball mechanism that defines the relief valving mechanism, the screw-adjustment mechanism within the tube being environmentally protected by a cap that screws over the end of the pipe or tube, utilizing the external threads of the pipe or tube. Another example is the valve stem used on vehicle tires and wheels, wherein the internally threaded portion of the cylindrical valve stem is utilized to threadedly receive therein the valve core element which defines the closure mechanism for the valve stem, and the external threads on the end of the cylindrical valve stem receive thereon the plastic or metal cap which is an environmental seal for the valving mechanism within the valve stem.

In these prior art dual thread applications, the internal and external threads function independently of each other, the internal threads serving a function related to the operation of the device itself, and the external threads simply serving as a means to attach a protective environmental cover over the internal mechanism.

In many prior art fluid devices (pumps, valves, motors, etc.), the device includes a cap or cover plate that must effectively seal the inner workings of the device. Such a cap or cover plate generally covers and seals a portion of the device body that needs to be accessible for purposes of manufacture, assembly, adjustment, etc. Many times these caps or plates are made of a different material from that of the device body. In such instances, differences in rates and amounts of material expansion and contraction between the cap or plate and the fluid device body occur because of applications of the fluid device in extremely high or low temperature environments, in high pressure environments, and/or due to water absorption by plastic components. In addition, conventional connector caps or nuts are generally of thinner wall construction than the bodies or mating connectors, and therefore tend to expand as the cap or nut is tightened, because of rotational (diametrical) thrust between the device threads and cap threads. In such instances (threaded caps or plates expanding different amounts and at different rates), thread separation occurs, thereby jeopardizing the fluid/environmental seal between the cap and plate or fluid device body.

OBJECTS OF THE INVENTION

It is an object of the present invention to provide a threaded engagement between two mating pieces that eliminates the problem of thread separation caused by different rates of expansion of dissimilar mating materials.

It is an object of the present invention to provide a threaded engagement between two mating pieces that eliminates the problem of thread separation caused by rotational thrust between the mating threads of the mating pieces.

It is a further object of the present invention to provide a threaded connection that increases the thread strength over the thread length in the mating threaded connectors.

It is a further object of the present invention to provide mating threaded connectors that more effectively maintain their circularity in contact, thereby maximizing actual thread contact between the mating threaded connectors.

It is a still further object of the present invention to provide mating threaded connectors that provide full thread strength in areas where recommended thread depth is not otherwise obtainable.

It is a still further object of the present invention to provide mating threaded connectors that are not susceptible to loosening under vibration as the mating connectors expand and contract due to varying thermal and/or pressure effects, or as a result of tightening.

SUMMARY OF THE INVENTION

A threaded connector comprises two members, each incorporating concentric synchronized dual threads that are adapted to engage mating concentric synchronized dual threads of the mating connector member, such that each mating connector member includes both external threads and internal threads. An alternative embodiment threaded connector comprises two members, each incorporating sets of concentric multiple synchronized threads that are adapted to engage mating sets of concentric multiple synchronized threads of the mating connector member, such that each mating connector member includes at least one set each of both external threads and internal threads.

BRIEF DESCRIPTION OF THE DRAWINGS

FIG. 12 is a sectional view taken through an in-line multiple synchronized thread connector for use with a flared fluid conduit.

FIG. 13 is a sectional view through a flare-type multiple synchronized thread connector, wherein the connector nut engages the body of a fluid device.

FIG. 14 is a sectional view similar to FIG. 13, illustrating a different type of flared fluid conduit connection.

DETAILED DESCRIPTION OF THE INVENTION

Figure 1:
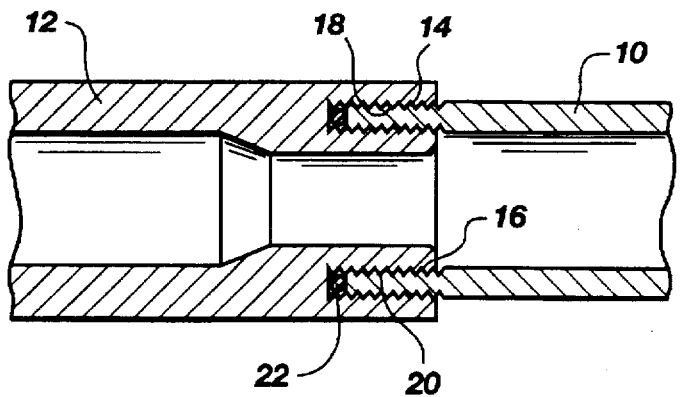
FIG. 1 is a sectional view taken through a simple pipe sleeve connection embodying the synchronized dual thread connectors of the present invention.

Turning now to the drawings, and initially to FIG. 1, the concept of the present invention is shown in its most simplistic form, that being a threaded connection between two pipes or other fluid conduits, one of them having an area of increased wall thickness in order to accommodate and accept the threaded end of the other. FIG. 1 is a sectional view through the threaded connectors, and illustrates a first threaded connector 10 on the right and the mating threaded connector 12 on the left. As shown, the first connector 10 is formed with a set of external threads 14 on the end thereof in a customary manner for a threaded pipe. In addition, the first connector 10 includes a set of internal threads 16 on the internal surface of the connector, also in a customary fashion. In accordance with the present invention, these internal and external threads 14 and 16, respectively, are synchronized, such that rotating the first connector 10 in the right hand (clockwise) direction enables the internal threads to travel along and engage mating threads on the mating threaded connector 12. In this regard, the mating connector 12 includes a set of internal threads 18 that engage corresponding external threads 14 of the first connector, and mating external threads 20 that engage corresponding internal threads 16 of the first connector. Of course, these corresponding internal and external threads 18 and 20, respectively, of the mating threaded connector 12 are also synchronized with each other so that they mate with and engage the synchronized external threads 14 and internal threads 16, respectively, of the first threaded connector 10 as the two threaded connectors are screw-threaded together.

In the embodiment shown in FIG. 1, all of the thread sets 14, 16, 18 and 20 are straight threads, as opposed to tapered pipe threads. Straight threads are not designed to serve as fluid seals between the two mating threaded pieces. Therefore, the embodiment of FIG. 1 includes an O-ring 22 in the bottom of the annular channel defined by the second connector synchronized internal threads 18 and external threads 20, for providing the fluid seal between the first and second threaded connectors 10, 12. Of course, the thread sets 14, 16, 18 and 20 can be tapered pipe threads, which are designed to effect a fluid seal therebetween, thereby obviating the necessity for the O-ring fluid seal. Also, of course, the fluid seal can be effected by sealing means other than O-rings, i.e., by any fluid seal design or type that is typical for the particular industry in which a synchronized dual thread connector of the present invention is utilized.

Figure 2:
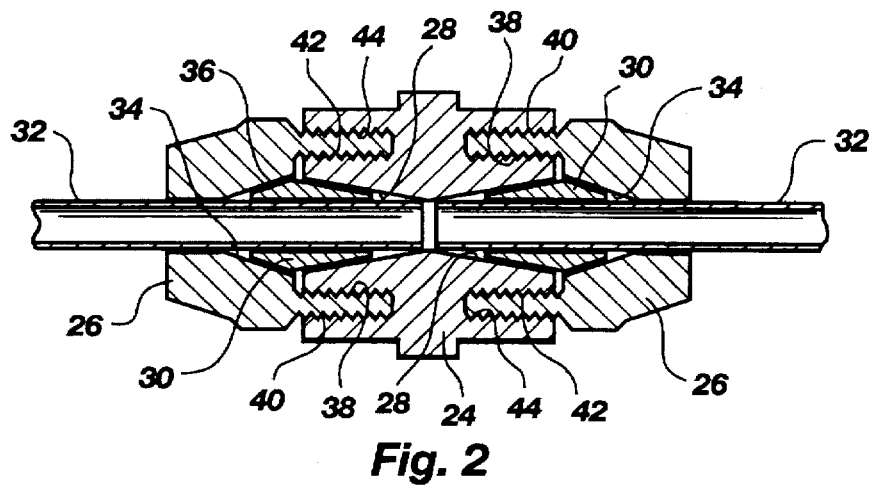
FIG. 2 is a sectional view taken through an in-line union fluid connector that utilizes the synchronized dual threads of the present invention, in a ferrule-type connector.

FIG. 2 is a sectional view taken through an in-line union ferrule-type fluid connector that utilizes the synchronized dual threads of the present invention. As shown, the connector of this embodiment comprises a union 24 and two nuts that are identical, and therefore will be designated by the same reference numeral 26. The union 24 includes identical and opposed frustoconical tapered surfaces 28 that engage respective tapered ferrules 30 positioned around identical ends of conduits or tubing 32 to be connected together in a fluid seal. Each nut 26 also includes a frustoconical tapered surface 34 for engaging the opposite tapered surface 36 of the ferrule 30. The workings of the union connector of FIG. 2 are customary and standard in the fluid industry.

Each nut 26 includes, in addition to the customary internal threads 38, a set of external threads 40 that are, of course, synchronized with the internal threads 38. These respective internal threads 38 and external threads 40 of the nut engage respective synchronized external threads 42 and internal threads 44 of the union 24. As is customary, these union connector threads 38, 40, 42, and 44 are straight threads, as opposed to tapered or pipe threads, and therefore do not effect a fluid seal. Rather, as is customary, the fluid seal of the connector of FIG. 2 is effected by the tapered ferrules 30 and their engagements with respective frustoconical tapered surfaces 28 of the union and 34 of the nut, and the ferrules' engagement with the fluid conduits 32.

In accordance with the concept of the present invention, the union 24 and nuts 26 incorporate synchronized dual thread connections in order to effect one or more of the objects of the present invention, as applied to ferrule-type fluid connectors. Specifically, the synchronized dual threads of the FIG. 2 connector maintain the circularity of both mating pieces and of the ferrule and fluid conduit. Synchronized dual threads also eliminate the possibility of the connector threads' separating due to dissimilar rates of expansion of the union and nuts constructed of dissimilar materials, and due to expansion of the conventional connector nut that has no outer portion of the union body to prevent such expansion.

Figure 3:
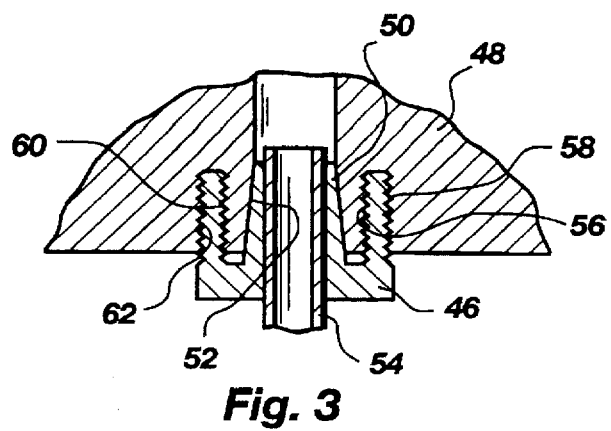
FIG. 3 is a sectional view taken through a synchronized dual thread ferrule connector nut that screws into the body of a fluid device, the ferrule being formed with the nut.

FIG. 3 is a sectional view taken through an alternative ferrule-type fluid connector that utilizes the synchronized dual threads of the present invention, the ferrule being formed as part of the nut. As shown, the connector of FIG. 3 includes a nut 46 that is adapted to threadedly engage the body of a fluid device 48, as in a pump, valve, motor, etc. The nut 46 has incorporated therewith a tapered ferrule 50 that is adapted to engage a mating frustoconical tapered surface 52 of the body of the fluid device in the customary manner to compress the ferrule down around a fluid conduit 54 as the nut is screwed into the body of the fluid device.

The nut 46 includes, in addition to the customary internal threads 56, a set of synchronized external threads 58 that engage respective synchronized external threads 60 and internal threads 62 formed with the body of the fluid device. The nut 46 of FIG. 3 functions in an identical manner to that of the nut 24 of the FIG. 2 connector to compress the tapered ferrule 50 down against the fluid conduit 54 in the customary manner as the nut is screwed into the fluid device 48. Again, the synchronized dual threads of the present invention incorporated into the connector of FIG. 3 effect the same objects in maintaining the fluid seal between the fluid device and conduit as in the previously described fluid connectors.

Figure 4:
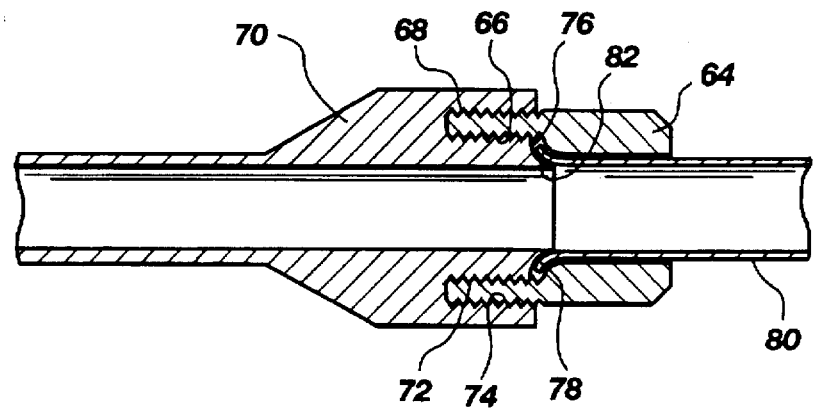
FIG. 4 is a sectional view taken through an in-line synchronized dual thread connector for use with a flared fluid conduit.

FIG. 4 is a sectional view taken through an in-line synchronized dual thread connector for use with a flared end fluid conduit. The connector of the embodiment of FIG. 4 comprises a nut 64 which is formed with a set of internal threads 66 in a customary manner for a flared end conduit connector nut. In addition, the nut 64 includes a set of external threads 68 on the external surface thereof which are synchronized with the internal threads 66, as has been previously described. The nut 64 is adapted to threadedly engage and be received into a mating connector 70. This mating connector 70 includes a set of external threads 72 that engage corresponding internal threads 66 of the nut, and a set of synchronized internal threads 74 that engage corresponding external threads 68 of the nut.

The mating connector 70 includes an inner tapered annular surface 76 that is adapted to engage and seal against a mating flared surface 78 of the fluid conduit 80. In this regard, the nut 64 also includes an inner tapered annular surface 82 that mates with the backside of the conduit flared surface 78 and urges the flared surface in fluid sealing relationship against the inner tapered annular surface 76 of the mating connector piece 70 in the convention manner to effect the fluid seal therebetween. The operation of the flared-type fluid connector of FIG. 4 is customary and standard in the fluid industry.

In accordance with the concept of the present invention, the flared fluid conduit nut 64 and mating connector 70 incorporate synchronized dual thread connections in order to effect one or more of the objects of the present invention, as applied to flared end conduit fluid connections. Specifically, the synchronized dual threads of the connector of FIG. 4 maintain the circularity of both mating pieces, the nut and mating connector, and specifically of the conduit flared surface 78 and the inner tapered annular surface 76 of the connector 70 to maintain a tight fluid seal therebetween, and also eliminate the possibility of the connector threads' separating due to dissimilar rates of expansion of the nut and its mating connector constructed of dissimilar materials.

Figure 5:
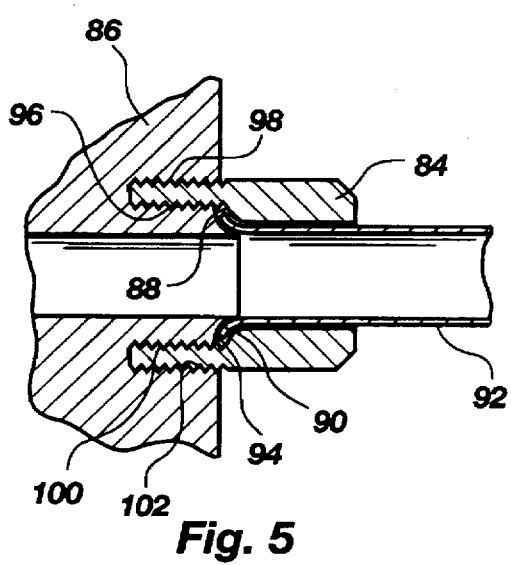
FIG. 5 is a sectional view through a flare-type synchronized dual thread connector, wherein the connector nut engages a portion of the body of a fluid device.

FIG. 5 is a sectional view through a flare-type synchronized dual thread connector, wherein the connector nut 84 is adapted to threadedly engage the body of a fluid device 86 as in a pump, valve, motor, etc. The nut 84 has incorporated therewith an inner tapered annular surface 88 that engages the backside of a flared end 90 of a fluid conduit 92 in the customary manner to urge the conduit flared end against a mating inner tapered annular surface 94 of the fluid device body 86 in order to effect a fluid seal therebetween. The nut 84 includes, in addition to the customary internal threads 96, a set of synchronized external threads 98 that engage respective synchronized external threads 100 and internal threads 102 formed with the body of the fluid device.

The nut 84 of FIG. 5 functions in an identical manner to that of the nut 64 of the FIG. 4 connector to urge the conduit flared end 90 against the fluid device body inner tapered annular surface 94 in the customary manner to effect the fluid seal therebetween as the nut is screwed into the fluid device 86. Again, the synchronized dual threads of the present invention incorporated into the connector of FIG. 5 effect the same objects in maintaining the fluid seal between the fluid device and conduit as in the previously described fluid connectors.

Figure 6:
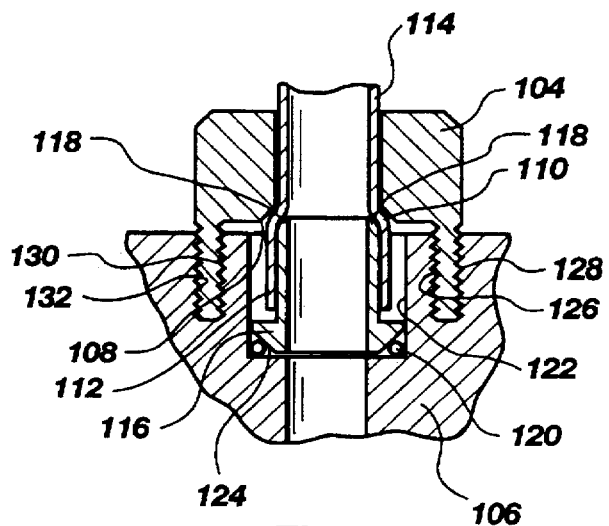
FIG. 6 is a sectional view similar to FIG. 5, illustrating a different type of fluid conduit flared connection.

FIG. 6 is a sectional view similar to FIG. 5, illustrating a different type of fluid conduit flared end connector. The connector of FIG. 6 includes a nut 104 that is adapted to threadedly engage the body of a fluid device 106, as in a pump, valve, motor, etc. The nut 104 has incorporated therewith an inner tapered annular surface 108 that is adapted to urge against an annular transition area 110 of an enlarged end 112 of a fluid conduit 114.

The fluid connector of FIG. 6 includes a ferrule sleeve 116 that functions similarly to the inner tapered annular surface 76 of the connector of FIG. 4 and inner tapered annular surface 94 of the fluid device body of FIG. 5 to form a fluid seal between the ferrule sleeve and the conduit 114. In this embodiment, the inner annular tapered surface 108 of the nut urges the annular transition area 110 of the conduit against a mating second annular tapered surface 118 of the ferrule sleeve in order to effect a fluid seal therebetween. The fluid seal between the ferrule sleeve 116 and the body of the fluid device 106 is effected by an O-ring seal 120 positioned in an annular channel defined by the bottom of the fluid device body borehole 122 and a tapered annular surface 124 of the ferrule sleeve 116.

The nut 104 in the FIG. 6 embodiment includes, in addition to the customary internal threads 126, a set of synchronized external threads 128 that engage respective synchronized external threads 130 and internal threads 132 formed with the body of the fluid device 106. The nut 104 of FIG. 6 functions in an identical manner to that of the nut 84 of the FIG. 5 connector to compress the conduit annular transition area 110 down against the tapered annular surface 118 of the ferrule sleeve 116 to effect a fluid seal therebetween in the customary manner as the nut is screwed into the fluid device. In addition, tightening the nut 104 down against the fluid conduit and ferrule sleeve also effects the fluid seal provided by the O-ring 120. Again, the synchronized dual threads of the present invention incorporated into the connector of FIG. 6 effect the same objects in maintaining the fluid seal between the fluid device and conduit as in the previously described fluid connectors.

Figure 7:
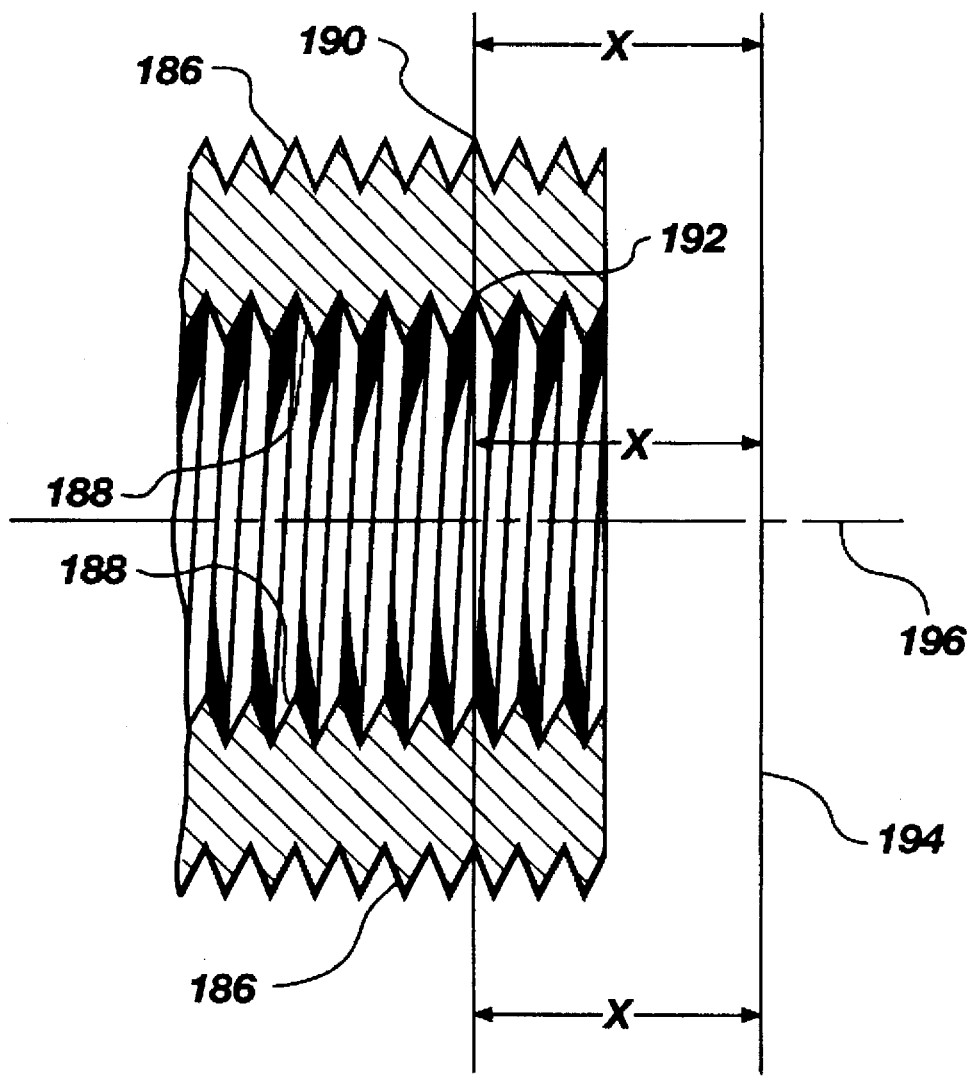
FIG. 7 is a sectional view through a portion of one connector incorporating the synchronized dual threads, illustrating the location of the starting points for both sets of threads relative to each other, in order to maximize the amount of material between the sets of threads.

FIG. 7 is a sectional view through a portion of one connector incorporating the synchronized dual threads of the present invention, illustrating the location of the starting points for both sets of threads relative to each other, in order to maximize the amount of material between the sets of threads. The connector has a set of external threads 186 and synchronized internal threads 188. The respective starting points of the threads are such that the crest 190 of the external threads 186 and a corresponding root 192 of the internal threads are always co-planar. Stated differently, the crest 190 and root 192 are always equidistant (X) from a plane 194 that is normal to the axis 196 of the threads. In this manner, the maximum amount of connector material is always between the external and internal threads, thereby maximizing the structural integrity of the connector itself, and of both sets of synchronized threads.

Those skilled in the art will readily appreciate that it will be virtually impossible to cross-thread a connector or closure member utilizing the synchronized dual thread design, if both sets of synchronized threads begin within the same plane and at the same rotational angle. This is because, with both sets of threads starting at precisely the identical location, each set will urge the other set into precise thread engagement, rather than into a potential cross-thread start. Additionally, attempting to cross-thread synchronized dual threads would be met with a force of resistance that is synergistic to that of the added resistance forces of attempting to cross-thread two single thread connectors.

Figure 8:
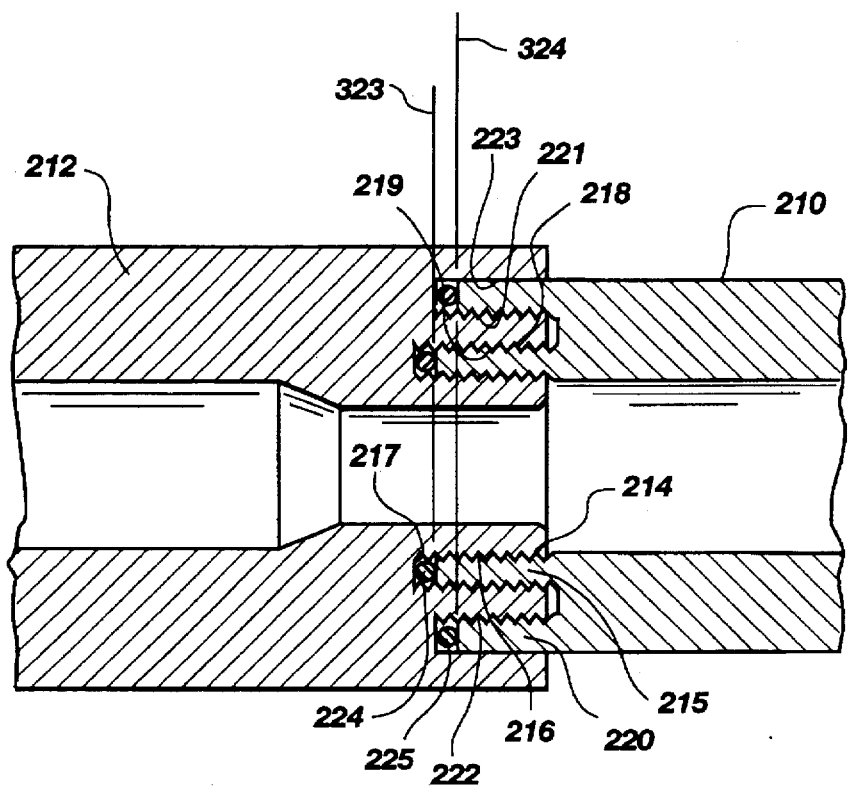
FIG. 8 is a sectional view taken through a pipe sleeve connection embodying the multiple synchronized thread connectors of the present invention.

FIG. 8 illustrates a threaded connection between two pipes or other fluid conduits, one of them having an area of increased wall thickness in order to accommodate and accept the threaded end of the other. FIG. 8 is a sectional view through the threaded connection, and illustrates a first threaded connector 210 on the right and a mating threaded connector 212 on the left. As shown, the first connector 210 is formed with a first set of internal threads 214 formed on the inside surface of a first annular flange 215, adapted to engage a first set of mating external threads 216 formed in a first annular channel 217 in the mating connector 214. In accordance with the present invention, these internal and external threads 214 and 216, respectively, are synchronized, such that rotating the first connector 210 in the right hand (clockwise) direction enables the internal threads to travel along and engage mating external threads on the mating threaded connector 212. For reference, this thread set 214, 216 is designated as the first set of mating synchronized threads.

The first connector first annular flange 215 also includes a set of external threads 218 that engage a set of corresponding internal threads 219 formed in the first annular channel 217 of the second connector 212. Of course, these corresponding external and internal threads 216 and 219, respectively, of the second threaded connector 212 are also synchronized with each other so that they mate with and engage respective synchronized internal threads 214 and external threads 218 of the first threaded connector 210 as the two threaded connectors are screw-threaded together. These threads 218, 219 are designated as the second set of mating synchronized threads.

Also in accordance with the present invention, the first threaded connector 210 is formed with a second annular flange 220, concentric with the first annular flange 215. A second set of internal threads 221 is formed on the inside surface of the second annular flange 220, and is adapted to engage a mating second set of external threads 222 formed in a second, outer concentric annular channel 223 in the body of the second connector 212. These threads 221, 222 are designated as the third set of mating synchronized threads.

The second annular flange outer surface of the first connector 210 is smooth, and is designed to tightly engage the internal wall of the second connector second annular channel 223, to prevent the first connector second flange 220 from expanding or deforming under the force of rotational thrust as the first connector is screwed into the second connector. The combination of these three sets of mating synchronized threads has a synergistic effect on the overall strength of the mating threads to result in an equivalent thread strength that is greater than that of the sum of the three individual sets of mating threads.

In the embodiment shown in FIG. 8, all of the thread sets 214, 216, 218, 219, 221, and 222 are straight threads, as opposed to tapered pipe threads. Straight threads are not designed to serve as fluid seals between the two mating threaded pieces. Therefore, the embodiment of FIG. 8 includes a first O-ring 224 in the bottom of the second connector first annular channel 217, and a second O-ring 225 in the bottom of the second connector second annular channel 223, both for providing the fluid seal between the first and second threaded connectors 210, 212.

Figure 9:
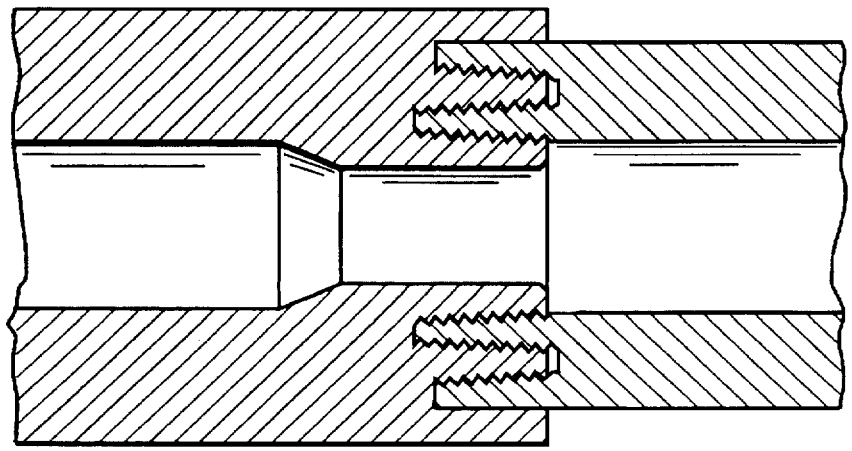
FIG. 9 is a sectional view similar to FIG. 8, illustrating multiple sets of synchronized tapered, fluid-sealing threads.

Of course, the thread sets 214, 216, 218, 219, 221, and 222 can be tapered threads, which are designed to effect a fluid seal therebetween, thereby obviating the necessity for the O-ring fluid seals. This is shown in FIG. 9. Also, of course, the fluid seals can be effected by sealing means other than O-rings, i.e., by any fluid seal design or type that is typical for the particular industry in which a multiple synchronized thread connector of the present invention may be utilized.

As shown in FIG. 8, the sets of mating synchronized threads on the first and second flanges 215, 220 begin within respective planes transverse to the thread axis. The sets of mating threads 214, 216 (the first connector external threads and second connector internal threads) and 218, 219 (the first connector first set of internal threads and second connector first set of external threads) begin within a first transverse plane 323; and the set of mating threads 221, 222 (the first connector second set of internal threads and second connector second set of external threads) begins within a second transverse plane 324. Those skilled in the art will readily appreciate that the first and second sets of mating threads 214, 216 and 218, 219 will engage first, and will effect a number of complete rotations before the third set of mating threads 221, 222 engages. In this manner, cross-threading is virtually eliminated because of the fact that the first-to-engage thread sets 214, 216 and 218, 219 have engaged for a number of complete rotations before the third-to-engage thread set 221,222 begins to engage. If the first-to-engage thread sets are cross-threaded, the third-to-engage thread set will not align properly, and will therefore prevent the two mating pieces from rotating further.

FIG. 8 illustrates the concept of having the various sets of mating threads begin within sequential parallel planes transverse to the thread axis. In essence, the first and second sets of mating threads on the first connector 210 may begin at a spaced apart rotational distance from the third set that is an integer factor of 360°. Specifically, the transverse plane 323 may be spaced from the transverse plane 324 a distance of two threads. Said another way, the third set of mating threads 221, 222 would engage 720° (two complete revolutions) following the initial engagement of the first-to-engage sets of mating threads 214, 216 and 218, 219.

The inventors have also determined that it is feasible to begin sequential sets of mating threads at respective starting points that are not integer multiples of 360°. Specifically, and with reference again to FIG. 8, although the external threads 214 and internal threads 216 begin within the same plane 323, their starting points are out of phase by 180°. In this manner, the crests and roots of one set of threads is always coplanar with respective roots and crests of the other set of threads. This orientation maximizes the amount of material between the external and internal threads, in order to optimize the structural integrity of the connector itself, and therefore both sets of threads. This is explained in more detail with reference to FIG. 7. It follows that, in order to optimize the structural integrity of multiple threaded connectors, adjacent thread sets should begin out of phase by 180°, or a 360° multiple of an integer plus one-half in order to maintain the coplanar alignment of adjacent root-to-crest and crest-to-root thread relationship, as is shown in FIG. 7.

Another advantage of having dual synchronized threads start 180° out of phase is that their respective starting points are on opposite sides of the connector (180° apart). In this manner, the two sets of 180° out of phase threads start simultaneously on opposite sides of the connector, and the engagement of one set of synchronized threads forces the opposite set of synchronized threads to also engage correctly without cross-threading. As previously explained, in the unlikely event that both sets of synchronized threads begin to cross-thread as the mating connectors are joined, the binding resistance force will be at least twice that of the binding resistance force of a single cross-threaded thread set, and therefore will be extremely difficult to continue cross-threading.

FIG. 9 is a sectional view similar to FIG. 8, illustrating three sets of synchronized tapered, fluid-sealing threads. FIG. 9 illustrates the taper to all three sets of tapered threads to be somewhat exaggerated from what would generally be necessary in a conventional tapered sealing thread. The taper is exaggerated in the illustration in order that the existence of the taper be clearly evident from the drawings. The three sets of synchronized threads and the other components illustrated in FIG. 9 are not numbered, it being understood that the respective thread sets of the first and second connectors of FIG. 9 function similarly to those illustrated in FIG. 8 to effect a fluid-seal between the two connectors.

In accordance with the concept of the present invention, the first connector and its threaded connection into the second connector incorporate multiple synchronized threads in order to effect one or more of the objects of the present invention. Specifically, the multiple synchronized threads of the FIG. 9 fluid connection maintain the circularity of the two connectors, and also eliminate the possibility of the threads' separating due to dissimilar rates or amounts of expansion of one connector relative to the other, caused by different coefficients of thermal expansion of different connector materials, or due to different amounts of material expansion or contraction in high-pressure environments, as in high fluid pressure applications or underwater applications.

Figure 10:
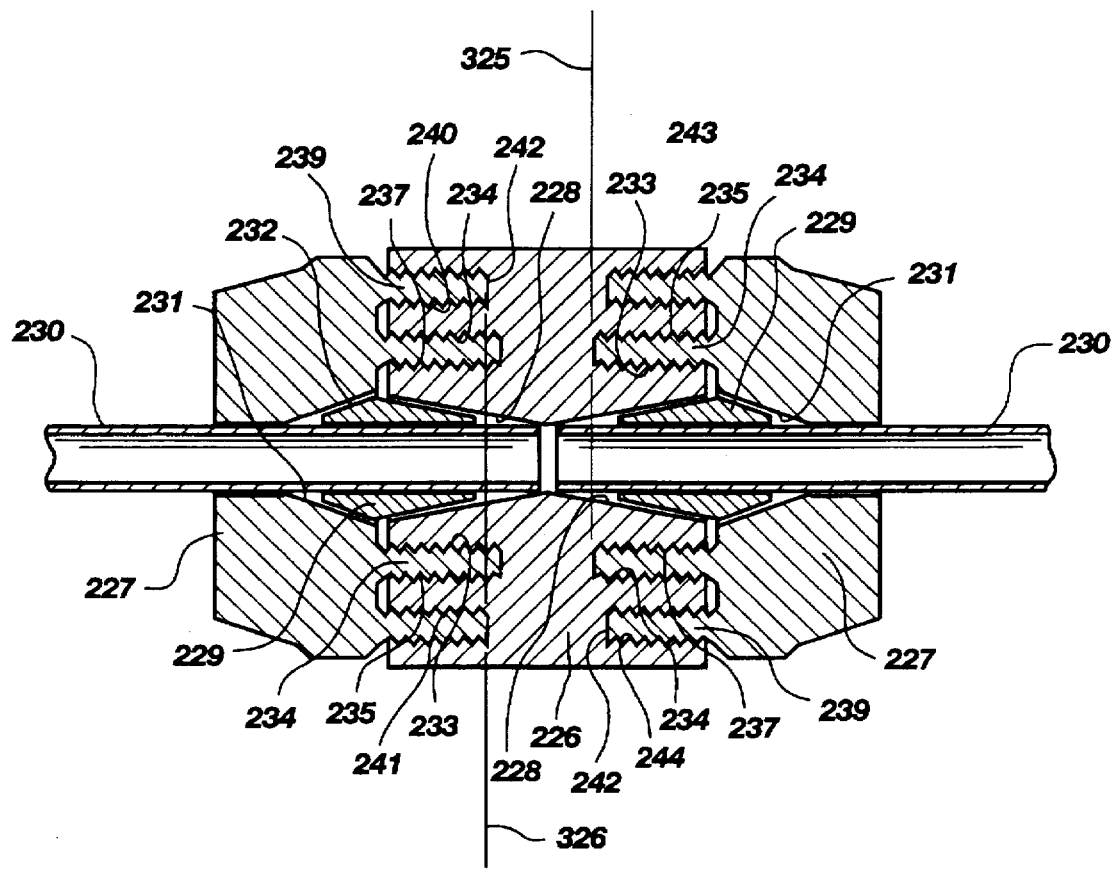
FIG. 10 is a sectional view taken through an in-line union fluid connector that utilizes the multiple synchronized threads of the present invention, in a ferrule-type connector.

FIG. 10 is a sectional view taken through an in-line union ferrule-type fluid connector that utilizes multiple synchronized threads of the present invention. As shown, the connector of this embodiment comprises a union 226 and two nuts that are identical, and therefore will be designated by the same reference numeral 227. The union 226 includes identical and opposed internal tapered surfaces 228 that engage respective tapered ferrules 229 positioned around identical ends of conduits or tubing 230 to be connected together in fluid-sealing engagement. Each nut 227 also includes an internally tapered surface 231 for engaging the opposite tapered surface 232 of the ferrule 229. The workings of the union connector of FIG. 10 are customary and standard in the fluid industry.

Each nut 227 includes a first set of internal threads 233, formed on the inside surface of a first annular flange 234, and a first set of external threads 235, synchronized with the internal threads 233, formed on the outer surface of the first annular flange. These internal threads 233 and external threads 235 of the nut engage respective synchronized first external threads 236 and first internal threads 237 formed in respective inner and outer surfaces of a first annular channel 238 of the union 226. As is customary, these union connector threads 233, 235, 236, and 237 are straight threads, as opposed to tapered or pipe threads, and therefore do not effect a fluid seal. Rather, as is customary, the fluid seal of the connector of FIG. 10 is effected by the tapered ferrules 229 and their engagements with respective internal tapered surfaces 228 of the union and 231 of the nut, and the ferrules' engagement with the fluid conduits 230. The threads 233, 235 are designated as the first set of mating synchronized threads, and the threads 236, 237 are designated as the second set of mating synchronized threads.

Also in accordance with the present invention, the nut 227 is formed with a second annular flange 239, concentric with the first annular flange 234. A second set of internal threads 240 is formed on the inside surface of the second annular flange 239, and is adapted to engage a mating second set of external threads 241 formed in a second, outer concentric annular channel 242 in the body of the union. These threads 240, 241 are designated as the third set of mating synchronized threads. The nut second, outer annular flange 39 outer surface also is formed with a second set of external threads 243 adapted to engage a second set of internal threads 244 formed in the second annular channel of the union. These threads 243, 244 are designated as the fourth set of mating synchronized threads. The combination of these four sets of mating synchronized threads has a synergistic effect on the overall strength of the mating threads to result in an equivalent thread strength that is greater than that of the sum of the four individual sets of mating threads.

In accordance with the concept of the present invention, the union 226 and nuts 227 incorporate multiple synchronized thread connections in order to effect one or more of the objects of the present invention, as applied to ferrule-type fluid connectors. Specifically, the multiple synchronized threads of the FIG. 10 connector maintain the circularity of both mating pieces and of the ferrule and fluid conduit. Multiple synchronized threads also eliminate the possibility of the connector threads' separating due to dissimilar rates of expansion of the union and nuts constructed of dissimilar materials, and due to expansion of the conventional connector nut that has no outer portion of the union body to prevent such expansion.

As shown in FIG. 10, the sets of mating synchronized threads on the nut first and second flanges 234, 239 begin within respective planes transverse to the thread axis. Specifically, the first and second sets of mating threads 233, 236 (the nut first set of internal threads and union first set of external threads) and 235, 237 (the nut first set of external threads and union first set of internal threads) begin within a first transverse plane 325; and the third and fourth sets of mating threads 240, 241 (the nut second set of internal threads and union second set of external threads) and 243, 244 (the nut second set of external threads and union second set of internal threads) begin within a second transverse plane 326. Those skilled in the art will readily appreciate that the first and second sets of mating threads 233, 236 and 235, 237 will engage first, and will effect a number of complete rotations before the third and fourth sets of mating threads 240, 241 and 243, 244 engage. In this manner, cross-threading is virtually eliminated because of the fact that the first- and second-to-engage thread sets 233, 236 and 235, 237 have engaged for a number of complete rotations before the third- and fourth-to-engage thread sets 40, 41 and 243, 244 begin to engage. If the first- and second-to-engage thread sets are cross-threaded, the third-and fourth-to-engage thread sets will not align properly, and will therefore prevent the two mating pieces from rotating further.

As explained with reference to FIG. 8, FIG. 10 also illustrates the concept of having the various sets of mating threads begin within sequential parallel planes transverse to the thread axis, and therefore, will not be explained further.

Figure 11:
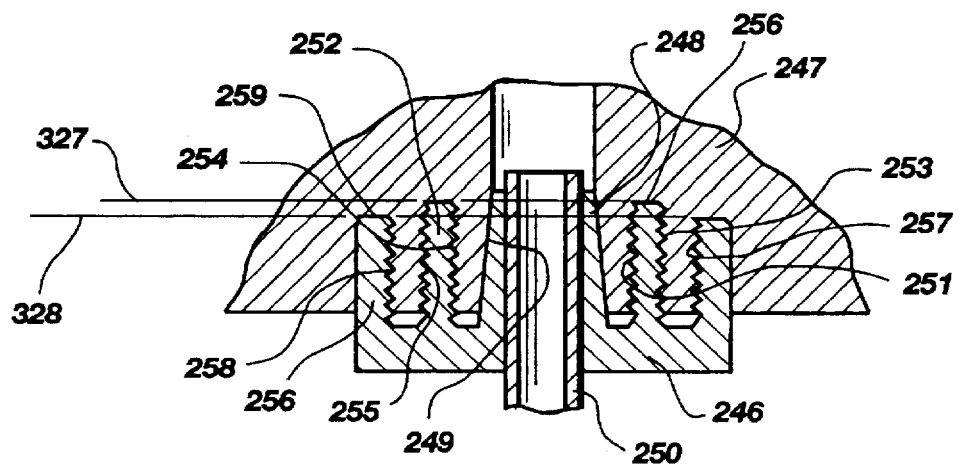
FIG. 11 is a sectional view taken through a multiple synchronized thread ferrule connector nut that screws into the body of a fluid device, the ferrule being formed with the nut.

FIG. 11 is a sectional view taken through an alternative ferrule-type fluid connector that utilizes multiple synchronized threads of the present invention, the ferrule being formed as part of the nut. As shown, the connector of FIG. 11 includes a nut 246 that is adapted to threadedly engage the body of a fluid device 247, as in a pump, valve, motor, etc. The nut 246 has incorporated therewith a tapered ferrule 248 that is adapted to engage a mating internally tapered surface 249 of the body of the fluid device 247 in the customary manner to compress the ferrule down around a fluid conduit 250 as the nut is screwed into the body of the fluid device.

The nut 246 includes a first set of internal threads 251, formed on the inside surface of a first annular flange 252, and a first set of external threads 253, synchronized with the internal threads 251, formed on the outer surface of the first annular flange. These respective internal threads 251 and external threads 253 of the nut engage respective synchronized first external threads 254 and first internal threads 255 formed in respective outer and inner surfaces of a first annular channel 256 of the fluid device body 247. As is customary, these fluid device body threads 251, 253, 254, and 255 are straight threads, as opposed to tapered or pipe threads, and therefore do not effect a fluid seal. Rather, as is customary, the fluid seal of the connector of FIG. 11 is effected by the tapered ferrule 248 formed with the nut 246, and its engagement with the internal tapered surface 249 of the fluid device body and ferrule 248 of the nut, and the ferrule's engagement with the fluid conduit 250. The threads 251, 253 are designated as the first set of mating synchronized threads, and the threads 254, 255 are designated as the second set of mating synchronized threads.

Also in accordance with the present invention, the nut 246 is formed with a second annular flange 256, concentric with the first annular flange 252. A second set of internal threads 257 is formed on the inside surface of the second annular flange 256, and is adapted to engage a mating second set of external threads 258 formed in a second, outer concentric annular channel 259 in the fluid device body. These threads 257, 258 are designated as the third set of mating synchronized threads.

The second, outer annular flange 256 outer surface is smooth, and is designed to tightly engage the inner wall of the fluid device second, outer annular channel 259 smooth wall to prevent the nut outer flange from expanding or deforming under the force of rotational thrust as the nut is screwed into the fluid device body. The combination of these three sets of mating synchronized threads has a synergistic effect on the overall strength of the mating threads to result in an equivalent thread strength that is greater than that of the sum of the three individual sets of mating threads.

As shown in FIG. 11, the sets of mating synchronized threads on the nut first and second flanges 252, 256 begin within respective planes transverse to the thread axis. Specifically, the first and second sets of mating threads 251, 254 (the nut first set of internal threads and fluid device body first set of external threads) and 253, 255 (the nut external threads and fluid device body internal threads) begin within a first transverse plane 327; and the third set of mating threads 257, 258 (the nut second set of internal threads and fluid device body second set of external threads) begins within a second transverse plane 328. Those skilled in the art will readily appreciate that the first and second sets of mating threads 251, 254 and 253, 255 will engage first, and will effect a number of complete rotations before the third set of mating threads 257, 258 engages. In this manner, cross-threading is virtually eliminated because of the fact that the first- and second-to-engage thread sets 251, 254 and 253, 255 have engaged for a number of complete rotations before the third-to-engage thread set 257, 258 begins to engage. If the first- and second-to-engage thread sets are cross-threaded, the third-to-engage thread set will not align properly, and will therefore prevent the two mating pieces from rotating further.

As explained with reference to FIG. 8, FIG. 11 also illustrates the concept of having the various sets of mating threads begin within sequential parallel planes transverse to the thread axis, and therefore, will not be explained further.

FIG. 12 is a sectional view taken through an in-line multiple synchronized thread connection for use with a flared end fluid conduit. The connection of the embodiment of FIG. 12 comprises a nut 260 adapted to screw directly into a mating connector 261 to attach the flared end of a fluid conduit 262 to the mating connector 261. The fluid connection of FIG. 12 incorporates four sets of multiple mating synchronized threads. The nut 260 is formed with first and second concentric annular flanges 263, 264, each including a set of synchronized internal and external threads. Specifically, the first annular flange 263 is formed with a first set of internal threads 265 and a first set of external threads 266. The second annual flange 264 is formed with a second set of internal threads 267 and a second set of external threads 268. As in previous embodiments, these threads are synchronized together, and are adapted to engage, respectively, a first set of external threads 269 and first set of internal threads 270 formed in a first annular channel 271 of the mating connector 261, and a second set of external threads 272 and second set of internal threads 273 formed in a second annual channel 274 of the mating connector. The combination of these four sets of mating synchronized threads has a synergistic effect on the overall strength of the mating threads to result in an equivalent thread strength that is greater than that of the sum of the four individual sets of mating threads.

The mating connector 261 also includes an inner tapered annular surface 276 that is adapted to engage and seal against a mating flared surface 278 of the fluid conduit 262. In this regard, the nut 260 also includes an inner tapered annular surface 282 that mates with the backside of the conduit flared surface 278 and urges the flared surface into fluid sealing relationship against the inner tapered annular surface 276 of the mating connector 261 in the convention manner to effect the fluid seal therebetween. The operation of the flared-type fluid connector of FIG. 12 is customary and standard in the fluid industry.

In accordance with the concept of the present invention, the flared fluid conduit nut 260 and mating connector 261 incorporate multiple synchronized thread connections in order to effect one or more of the objects of the present invention, as applied to flared end conduit fluid connections. Specifically, the multiple synchronized threads of the connector of FIG. 12 maintain the circularity of both mating pieces, the nut and mating connector, and specifically of the conduit flared surface 278 and the inner tapered annular surface 276 of the connector 261 to maintain a tight fluid seal therebetween, and also eliminate the possibility of the connector threads' separating due to dissimilar rates of expansion of the nut and its mating connector constructed of dissimilar materials.

As shown in FIG. 12, the sets of mating synchronized threads on the nut first and second flanges 263, 264 begin within respective planes transverse to the thread axis. Specifically, the first and second sets of mating threads 265, 269 (the nut first set of internal threads and mating connector first set of external threads) and 266, 270 (the nut first set of external threads and mating connector first set of internal threads) begin within a first transverse plane 329; and the third and fourth sets of mating threads 267, 272 (the nut second set of internal threads and mating connector second set of external threads) and 268, 273 (the nut second set of external threads and mating connector second set of internal threads) begin within a second transverse plane 330. Those skilled in the art will readily appreciate that the first and second sets of mating threads 265, 269 and 266, 270 will engage first, and will effect a number of complete rotations before the third and fourth sets of mating threads 267, 272 and 268, 273 engage. In this manner, cross-threading is virtually eliminated because of the fact that the first- and second-to-engage thread sets 265, 269 and 266, 270 have engaged for a number of complete rotations before the third- and fourth-to-engage thread sets 267, 272 and 268, 273 begin to engage. If the first- and second-to-engage thread sets are cross-threaded, the third-and fourth-to-engage thread sets will not align properly, and will therefore prevent the two mating pieces from rotating further.

As explained with reference to FIG. 8, FIG. 10 also illustrates the concept of having the various sets of mating threads begin within sequential parallel planes transverse to the thread axis, and therefore, will not be explained further.

FIG. 13 is a sectional view through a flare-type multiple synchronized thread connector, wherein the connector nut 280 is adapted to threadedly engage the body of a fluid device 281 as in a pump, valve, motor, etc. The nut 280 has incorporated therewith an inner tapered annular surface 282 that engages the backside of a flared end 283 of a fluid conduit 284 in the customary manner to urge the conduit flared end against a mating inner tapered annular surface 285 of the fluid device body 281 in order to effect a fluid seal therebetween. The fluid connection of FIG. 13 incorporates four sets of multiple mating synchronized threads. The nut 280 is formed with first and second concentric annular flanges 286, 287, each including a set of synchronized internal and external threads. Specifically, the first annular flange 86 is formed with a first set of internal threads 288 and a first set of external threads 289. The second annual flange 287 is formed with a second set of internal threads 290 and a second set of external threads 291. As in previous embodiments, these threads are synchronized together, and are adapted to engage, respectively, a first set of external threads 292 and first set of internal threads 293 formed in a first annular channel 294 of the fluid device body 281, and a second set of external threads 295 and second set of internal threads 296 formed in a second annual channel 297 of the fluid device body.

The nut 280 of FIG. 13 functions in an identical manner to that of the nut 260 of the FIG. 12 connector to urge the conduit flared end 283 against the fluid device body inner tapered annular surface 285 in the customary manner to effect the fluid seal therebetween as the nut is screwed into the fluid device body 281. Again, the multiple synchronized threads of the present invention incorporated into the connector of FIG. 13 effect the same objects in maintaining the fluid seal between the fluid device and conduit as in the previously described fluid connectors.

As shown in FIG. 13, the sets of mating synchronized threads on the nut first and second flanges 286, 287 begin within respective planes transverse to the thread axis. Specifically, the first and second sets of mating threads 288, 292 (the nut first set of internal threads and fluid device body first set of external threads) and 289, 293 (the nut first set of external threads and fluid device body first set of internal threads) begin within a first transverse plane 331; and the third and fourth sets of mating threads 290, 295 (the nut second set of internal threads and fluid device body second set of external threads) and 291,296 (the nut second set of external threads and fluid device body second set of internal threads) begin within a second transverse plane 332. Those skilled in the art will readily appreciate that the first and second sets of mating threads 288, 292 and 289, 293 will engage first, and will effect a number of complete rotations before the third and fourth sets of mating threads 290, 295 and 291, 296 engage. In this manner, cross-threading is virtually eliminated because of the fact that the first- and second-to-engage thread sets 288, 292 and 289, 293 have engaged for a number of complete rotations before the third- and fourth-to-engage thread sets 290, 295 and 291, 296 begin to engage. If the first- and second-to-engage thread sets are cross-threaded, the third-and fourth-to-engage thread sets will not align properly, and will therefore prevent the two mating pieces from rotating further.

As explained with reference to FIG. 8, FIG. 13 also illustrates the concept of having the various sets of mating threads begin within sequential parallel planes transverse to the thread axis, and therefore, will not be explained further.

FIG. 14 is a sectional view similar to FIG. 13, illustrating a different type of fluid conduit flared end connector. The connector of FIG. 14 includes a nut 300 that is adapted to threadedly engage the body of a fluid device 301, as in a pump, valve, motor, etc. The nut 100 has incorporated therewith an inner tapered annular surface 302 that is adapted to urge against an annular transition area 303 of an enlarged end 304 of a fluid conduit 305.

The fluid connector of FIG. 14 includes a ferrule sleeve 306 that functions similarly to the inner tapered annular surface 276 of the connector of FIG. 12 and inner tapered annular surface 285 of the fluid device body of FIG. 13 to form a fluid seal between the ferrule sleeve and the conduit 305. In this embodiment, the inner annular tapered surface 302 of the nut urges the annular transition area 303 of the conduit against a mating second annular tapered surface 307 of the ferrule sleeve in order to effect a fluid seal therebetween. The fluid seal between the ferrule sleeve 306 and the body of the fluid device 301 is effected by an O-ring seal 308 positioned in an annular channel defined by the bottom of the fluid device body borehole 309 and a tapered annular surface 310 of the ferrule sleeve 306.

The fluid connection of FIG. 14 incorporates four sets of multiple mating synchronized threads. The nut 300 is formed with first and second concentric annular flanges 311, 312, each including a set of synchronized internal and external threads. Specifically, the first annular flange 311 is formed with a first set of internal threads 313 and a first set of external threads 314. The second annual flange 312 is formed with a second set of internal threads 315 and a second set of external threads 316. As in previous embodiments, these threads are synchronized together, and are adapted to engage, respectively, a first set of external threads 317 and first set of internal threads 318 formed in a first annular channel 319 of the fluid device body 301, and a second set of external threads 320 and second set of internal threads 321 formed in a second annual channel 322 of the fluid device body. The combination of these four sets of mating synchronized threads has a synergistic effect on the overall strength of the mating threads to result in an equivalent thread strength that is greater than that of the sum of the four individual sets of mating threads.

The nut 300 of FIG. 14 functions in an identical manner to that of the nut 280 of the FIG. 13 connector to compress the conduit annular transition area 303 down against the tapered annular surface 307 of the ferrule sleeve 306 to effect a fluid seal therebetween in the customary manner as the nut is screwed into the fluid device. In addition, tightening the nut 300 down against the fluid conduit and ferrule sleeve also effects the fluid seal provided by the O-ring 308. Again, multiple synchronized threads of the present invention incorporated into the connector of FIG. 14 effect the same objects in maintaining the fluid seal between the fluid device and conduit as in the previously described fluid connectors.

As shown in FIG. 14, the sets of mating synchronized threads on the nut first and second flanges 311, 312 begin within respective planes transverse to the thread axis. Specifically, the first and second sets of mating threads 313, 317 (the nut first set of internal threads and fluid device body first set of external threads) and 314, 318 (the nut first set of external threads and fluid device body first set of internal threads) begin within a first transverse plane 333; and the third and fourth sets of mating threads 315, 320 (the nut second set of internal threads and fluid device body second set of external threads) and 316, 321 (the nut second set of external threads and fluid device body second set of internal threads) begin within a second transverse plane. Those skilled in the art will readily appreciate that the first and second sets of mating threads 313, 317 and 314, 318 will engage first, and will effect a number of complete rotations before the third and fourth sets of mating threads 315, 320 and 316, 321 engage. In this manner, cross-threading is virtually eliminated because of the fact that the first- and second-to-engage thread sets 313, 317 and 314, 318 have engaged for a number of complete rotations before the third- and fourth-to-engage thread sets 315, 312 and 316, 321 begin to engage. If the first- and second-to-engage thread sets are cross-threaded, the third-and fourth-to-engage thread sets will not align properly, and will therefore prevent the two mating pieces from rotating further.

As explained with reference to FIG. 8, FIG. 14 also illustrates the concept of having the various sets of mating threads begin within sequential parallel planes transverse to the thread axis, and therefore, will not be explained further.

FIG. 8 is a sectional view through a synchronized dual thread protective cap 334 that is adapted to cover an open access area of a fluid device 336. This protective cap 334 includes a set of internal threads 338 adapted to engage mating external threads 340 formed in an annular channel in the body of the fluid device, as is customary in caps of this nature. In addition to the internal threads 338, the protective cap includes a set of synchronized external threads 342 adapted to engage and mate with corresponding synchronized internal threads 344 formed with the fluid device.

The protective cap 334 of FIG. 8 is adapted to cover an open access area of a fluid device, as in a pump, motor, valve, etc., and therefore must effect a fluid and environmental seal between the cap and body of the fluid device. Therefore, these mating synchronized threads 338 and 342 of the cap and 340 and 344 of the fluid device body are tapered threads in order to effect the fluid seal therebetween as the cap is tightened down into the fluid device body. FIG. 8 illustrates the taper to both sets of tapered threads 338, 340 and 342, 344 to be somewhat exaggerated from what would generally be necessary in a conventional tapered sealing thread. The taper is exaggerated in the illustration in order that the existence of the taper be clearly evident from the drawings.

It can be appreciated that, in certain instances, the tapered threads of the protective cap 334 could tend to collapse the walls of the fluid device 336 around the access opening, as in when the device is constructed of plastic or other soft material, and/or the wall between the access opening and fluid device external threads 340 is relatively thin. In such instances, it is desirable to form the protective cap 334 with a shoulder 335 that is designed to fit into the access opening to oppose such wall collapse. This cap shoulder 135 may include a slight taper, for instance in an amount equal to the thread taper, in order to more effectively seal against the access opening wall, and prevent collapse or movement of the access opening wall.

In accordance with the concept of the present invention, the protective cap 334 and its threaded connection into the fluid device 336 incorporate synchronized dual threads in order to effect one or more of the objects of the present invention. Specifically, the synchronized dual threads of the FIG. 8 protective cap maintain the circularity of the cap and its threaded connection to the fluid device, and also eliminate the possibility of the cap threads' separating due to dissimilar rates or amounts of expansion of the cap relative to the fluid device body, caused by different coefficients of thermal expansion of different cap and fluid device materials, or due to different amounts of material expansion or contraction in high-pressure environments, as in high fluid pressure applications or underwater applications.

FIG. 9 is a sectional view through an alternative embodiment of a synchronized dual thread cap 346, illustrating the reverse concept of the cap and its threaded connection to the body of a fluid device 348. The protective cap 346 includes a set of internal threads 250 formed in an annular channel, and adapted to engage mating external threads 352 formed in a cylindrical extension of the body of the fluid device, in a customary manner. In addition to the internal threads 350, the protective cap of FIG. 9 also includes a set of synchronized external threads 354 formed in an annular channel, and adapted to engage and mate with corresponding synchronized internal threads 356 formed on the internal surface of the fluid device cylindrical connector portion. As in FIG. 8, FIG. 9 illustrates the taper to both sets of tapered threads 350, 352 and 354, 356 to be somewhat exaggerated from what would generally be necessary in a conventional tapered sealing thread. The taper is exaggerated in the illustration in order that the existence of the taper be clearly evident from the drawings.

As in the cap of FIG. 8, the protective cap 346 shown in FIG. 9 is adapted to cover an open access area of a fluid device and provide a fluid and environmental seal therefor. Therefore, the mating synchronized threads of the cap and fluid device are tapered threads in order to effect this fluid seal as the cap is tightened down onto the fluid device.

FIG. 10 is a sectional view of a protective cap 362 similar to that shown in FIG. 8, illustrating the placement of O-ring seals 358 and 360 between the undersurface of the cap 362 and the external surface of the body of the fluid device 364. The cap 362 includes synchronized internal threads 366 and external threads 368 that engage mating synchronized dual external threads and internal threads 372 in an annular channel in the fluid device in identical orientation to that shown in FIG. 8. The synchronized dual threads of the FIG. 10 embodiment are not tapered threads, but rather are straight, non fluid-sealing threads, thus necessitating the O-rings 358 and 360 for fluid sealing between the cap and fluid device. Nonetheless, the protective cap 362 may be formed with a shoulder 363 that is designed to fit into the access opening to oppose any potential collapse of the access opening wall, as in the cap and shoulder 334, 335 in the embodiment of FIG. 8. In addition, a third O-ring 374 may be positioned in the bottom of the annular channel defined by the fluid device body synchronized external and internal threads, 370 and 372, for providing additional fluid sealing capability between the fluid device body and its protective environmental cap.

FIG. 11 is a sectional view similar to FIG. 9, illustrating the placement of an O-ring for effecting the fluid seal between the protective cap 378 and body of the fluid device 380. The embodiment of FIG. 11, like that of FIG. 10, utilizes sets of synchronized straight threads as opposed to fluid sealing pipe threads, in order that the internal threads 382 of the fluid device may also be used to facilitate assembly or adjustment of the pump, motor, valve, etc.

Therefore, the O-ring 376 is positioned on the outside of the fluid device cylindrical extension adjacent the external threads.

Straight threads are utilized in the embodiment of FIG. 11 in instances wherein the internal threads of the fluid device are also used for facilitating an internal function of the fluid device, as in a screw-threaded adjustment in a fluid relief valve, insertion of a fluid sealing plug into a fluid pump, motor, or valve, etc. In these instances, the fluid device internal threads serve a dual purpose, and therefore cannot be tapered threads. The O-ring 376 is used in these instances to effect the fluid and environmental seal between the cap 378 and fluid device 380, as opposed to tapered threads which cannot be used in such an application. In addition, a second O-ring 384 may be positioned in the bottom of the annular channel defined by the protective cap synchronized threads for providing additional fluid sealing capability between the cap and fluid device body.

A variation of the environmental caps of FIGS. 7, 8, 9, and 10 would comprise a mixed combination of both straight and tapered threads. Specifically, the innermost mating threads in each embodiment can be straight threads, and the concentric outer threads can be tapered threads. In such a configuration, O-rings or other seals may or may not be necessary, depending on the particular application, thread type, depth, and possibly various other factors. Of course, these straight and tapered threads in combination can be reversed, except in the protective cap of FIG. 11, inasmuch as the internal threads 382 must be straight threads because of their dual function.

From the foregoing, it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. For example, the concept of this invention is intended to embrace left-hand threads and multiple thread applications, that is, connections wherein two or more threads are cut beside each other in order to effect the two objectives: (1) fine thread size for greater strength per linear increment, and (2) greater lead, i.e., greater linear travel per rotation in fine threads. One or more of the sets of mating multiple synchronized threads may be of the multiple thread type, the obvious limitation being that the lead of the threads, as opposed to the pitch in these instances, be equal for both thread sets. It should also be apparent that in some applications, it may be desirable for one set of mating threads to engage before the other set engages, thereby facilitating attachment of the two connectors. In addition, the term "connector" is to be broadly construed to include any device wherein screw threads are utilized to connect or attach two members together, e.g., the section of a solid rocket booster housing. It is to be understood that all matter herein set forth or shown in the accompanying drawings is to be interpreted as illustrative and not in a limiting sense.

What is claimed is:

1. A threaded fluid connector comprising:
   a first member having first and second sets of external threads and first and second sets of internal threads synchronized with the external threads; and
   a second member having first and second sets of internal threads adapted to mate with the first member first and second sets of external threads, and first and second sets of external threads adapted to mate with the first member respective first and second sets of internal threads, the second member first and second sets of external threads being synchronized with each other and with the second member first and second sets of internal threads.

2. A threaded fluid connector as set forth in claim 1, wherein all of the threads are straight, non-tapered threads.

3. A threaded fluid connector as set forth in claim 2, further comprising sealing means for fluidly sealing between the first and second members.

4. A threaded fluid connector as set forth in claim 1, wherein one or both sets of the first member threads comprises multiple threads.

5. A threaded fluid connector as set forth in claim 1, wherein the external and internal threads are oriented in a manner to maximize the amount of material between the external and internal threads.

6. A threaded fluid connector as set forth in claim 2, wherein one of the fluid connector members further comprises an external annular beveled surface that cooperates with a mating internal annular beveled surface formed with the other of the fluid connector members for sealing against a flared end of a fluid conduit within the other of the fluid connector members.

7. A threaded fluid connector comprising:
   (a) a first member having:
      a first annular flange having:
         a set of external threads and
         a first set of internal threads, and
      a second annular flange having a second set of internal threads,
   the first member set of external threads being synchronized with the first member first and second sets of internal threads; and
   (b) a second member having:
      a first annular channel having:
         a set of internal threads adapted to mate with the first member first set of external threads, and
         a first set of external threads adapted to mate with the first member first set of internal threads, and
      a second annular channel having a second set of external threads adapted to mate with the first member second set of internal threads, the second member internal threads being synchronized with the second member first and second sets of external threads.

8. A threaded fluid connector as set forth in claim 7, wherein all of the threads are straight, non-tapered threads.

9. A threaded fluid connector as set forth in claim 8, further comprising sealing means for fluidly sealing between the first member and second member.

10. A threaded fluid connector as set forth in claim 7, wherein respective sets of mating threads are oriented to initiate engagement simultaneously as the second member is attached to the first member.

11. A threaded fluid connector as set forth in claim 7, wherein respective sets of mating threads are oriented to initiate engagement sequentially as the second member is attached to the first member.

12. A threaded fluid connector as set forth in claim 7, wherein the first thread of each set of second member threads begins within the same plane transverse to the thread axis.

13. A threaded fluid connector as set forth in claim 7, wherein the first thread of each set of second member threads begins within a different plane transverse to the thread axis.

14. A threaded fluid connector as set forth in claim 7, wherein one or both sets of the first member threads comprises multiple threads.

15. A threaded fluid connector as set forth in claim 7, wherein the external and internal threads are oriented in a manner to maximize the amount of material between the external and internal threads.

16. A threaded fluid connector comprising:
(a) a first member having:
   a first annular flange having:
      a first set of external threads and
      a first set of internal threads, and
   a second annular flange having:
      a first set of internal threads and
      a first set of external threads, and
the first member first and second sets of external threads being synchronized with each other and with the first member first and second sets of internal threads; and
(b) a second member having:
   a first annular channel having:
      a first set of internal threads adapted to mate with the first member first set of external threads, and
      a first set of external threads adapted to mate with the first member first set of internal threads, and
   a second annular channel having:
      a second set of external threads adapted to mate with the first member first set of internal threads, and
      a second set of internal threads adapted to mate with the first member first set of external threads,
the second member first and second sets of internal threads being synchronized with each other and with the second member first and second sets of external threads.

17. A threaded fluid connector as set forth in claim 16, wherein all of the threads are straight, non-tapered threads.

18. A threaded fluid connector as set forth in claim 17, further comprising sealing means for fluidly sealing between the first member and second member.

19. A threaded fluid connector as set forth in claim 16, wherein respective sets of mating threads are oriented to initiate engagement simultaneously as the second member is attached to the first member.

20. A threaded fluid connector as set forth in claim 16, wherein respective sets of mating threads are oriented to initiate engagement sequentially as the second member is attached to the first member.

21. A threaded fluid connector as set forth in claim 16, wherein the first thread of each set of second member threads begins within the same plane transverse to the thread axis.

22. A threaded fluid connector as set forth in claim 16, wherein the first thread of each set of second member threads begins within a different plane transverse to the thread axis.

23. A threaded fluid connector as set forth in claim 16, wherein one or both sets of the first member threads comprises multiple threads.

24. A threaded fluid connector as set forth in claim 16, wherein the external and internal threads are oriented in a manner to maximize the amount of material between the external and internal threads.

* * * * *